United States Patent

[11] 3,617,307

| [72] | Inventor | Petrus Adam Inklaar |
| | | Diepenveen, Netherlands |
| [21] | Appl. No. | 720,374 |
| [22] | Filed | Apr. 10, 1968 |
| [45] | Patented | Nov. 2, 1971 |
| [73] | Assignee | Vasco Industries |
| | | New York, N.Y. |
| [32] | Priority | Apr. 11, 1967 |
| [33] | | Netherlands |
| [31] | | 6705069 |
| | | Continuation of application Ser. No. 527,063, Feb. 14, 1966, now Patent No. 3,552,978. |

[54] METHOD OF MANUFACTURING IMPROVED MEAT PRODUCTS OF THE SAUSAGE TYPE AND COMPOSITION THEREFOR
12 Claims, No Drawings

[52] U.S. Cl. ........................................................ 99/109
[51] Int. Cl. ........................................................ A22c 11/00

[50] Field of Search ............................................ 99/107, 108, 109, 140

[56] References Cited
UNITED STATES PATENTS

| 3,216,827 | 11/1965 | Fetty ............................ | 99/108 |
| 3,394,016 | 7/1968 | Bidmead et al. ............... | 99/140 |

*Primary Examiner*—Hyman Lord
*Attorneys*—Albert C. Johnston, Robert E. Isner, Lewis H. Eslinger and Alvin Sinderbrand ABSTRACT: Ground meat products (sausages, etc.) are given added protein contents yet deleterious jelly (aqueous) and fat deposits are avoided by incorporating into the meat composition finely divided water soluble protein, e.g., soy bean, milk or egg protein, alpha-amino acid of stated nature and acid-buffering power, e.g., a mixture of sodium glycinate and glycine or lysine-HCl, histidine or methiomine or a slat thereof, or other such acid. The additions are made during cuttering. They may be in a finely divided preparation of the protein with 1 to 10 percent of its weight of the amino acid.

METHOD OF MANUFACTURING IMPROVED MEAT PRODUCTS OF THE SAUSAGE TYPE AND COMPOSITION THEREFOR

This application is a continuation-in-part of my copending application Ser. No. 527,063 filed Feb. 14, 1966, now U.S. Pat. No. 3,552,978.

This invention relates to a method of improving the properties of meat-containing products, such as sausages of any type and shape, and to an additive for such improvement.

Heretofore, products such as milk, especially skim milk, have been used to modify the properties of food products including meat. A growing tendency may even be observed to add to meat proteins containing meat products other proteins that are more widely available and in many cases also cheaper. The quantities of added protein may vary greatly but normally are between 1 and 6 percent though smaller quantities, down to some tenths of a percent and larger quantities up to 20 percent all based on the weight of the final product have been added.

The meat products are in general sausage-type products, the stuffing or which is prepared from a number of ingredients in a so-called cutter. As proteins, milk proteins (nonfat dry milk, sodium caseinate) or vegetable proteins obtained from leguminous plants, especially soy proteins, are added. Other proteins, such as potato proteins, blood plasm, whey protein and chicken protein may be used also. Sausage products made from or with the addition of meat of birds, such as chicken, turkey, duck, or fish may also be improved by the addition of a combination of ingredients or the preparations according to the invention. Addition of separate proteins or of at least about 40 percent of water-soluble protein-containing products to a sausage mass often gives a favorable result with respect to the fat separation in the final product, namely in the sense that the fat as present in the final product is predominantly in the form of minute dispersed fat particles. This result is, apart from the composition of the sausage mass and a number of other factors, such as temperature, time and method of cuttering, above all also dependent on the properties of the added protein product.

Though the addition of protein has a favorable influence on the fat dispersion and so improves the taste, appearance and digestibility of the final product it does not improve and sometimes even may increase the formation of aqueous deposits in the meat product. Such deposits may vary in size but can be of an inch diameter and even larger. They are rather viscous forming a so-called jelly which also contains other water soluble or water-dispersible matter, forming an excellent nutritious medium for the rapid growth of micro-organisms which may result even in serious spoilage.

Accordingly a primary object of the invention is to provide a method of to improve the structure, flavor and other palatal properties of meat-containing products.

A further object of the invention is to provide novel and improved meat compositions. A still further object of the invention is to provide a novel additive to increase the shelf life and stability of meat-containing products.

Another object of the invention is to make available cheaper food products of high quality and excellent nutritional value by providing food products with a high protein content consisting partially of nonmeat proteins. Other objects and advantages of the invention will become apparent from the subsequent detailed description.

Briefly the present invention is based on the discovery that certain proteins in combination with certain amino acids of the monocarboxylic type greatly improve the properties of meat-protein-containing products.

The food products with which the present invention is concerned are ground meat and meat products which at least in one stage of their processing undergo a temperature rise. Examples are hamburger meat, sausage, lamb meat, frankfurters, bolognas, meat loaves, luncheon meats and the like.

When adding to such meat products a finely divided protein one should take care to select a type with a high "nitrogen soluble index" (NSI) which is a measure for the dispersibility of the protein in the meat product.

At least 20 percent, but preferably 40–100 percent of the added protein must be water soluble. This solubility is determined by dissolving at pH 7 a quantity of 2.5 grams of protein in 100 milliliter (ml.) of water and by agitating the mixture during 1 hour at 50° C. Then the solid material is separated by centrifuging during 10 minutes at 3,000 r.p.m. The supernatant liquid is brought into a measuring flask of 250 ml., whereas the residue is treated another time according to the above method. The liquid obtained thereby is also brought into the measuring flask and the latter is filled to 250 ml. After filtration through "black ribbon" filter paper (Schleicher and Schüll) 100 ml. of it is brought into a Kjehldahl flask and the nitrogen content is determined in the conventional manner. A nitrogen determination is also performed in the original product.

The NSI is now: (number of mg. nitrogen in 100 ml. liquid from centrifuged product) divided by (number of mg. nitrogen in 1 gram original protein) times 100.

Customary soluble protein-containing commercial products useful according to the invention are for example nonfat dry milk, sodium caseinate, protein powders prepared from birds (including chicken) eggs, products prepared from soy beans, which may contain 40–100 percent of soluble protein. For the application of the invention, also protein concentrates obtained from cheese whey may be advantageously used. The protein content of the finely divided protein-containing materials used generally comprises at least 45 percent by weight of water soluble protein.

Surprisingly, it was found that the fat separation as well as the formation of the jelly could both be prevented to a considerable degree and often completely when, besides the protein, one or more alpha-amino acids were added, namely in a quantity of 0.1–1 percent calculated on the meat content of the sausage mass and of such buffering capacity that in a 1 percent aqueous solution per gram of mixture more than 20 ml. 0.1 strong acid is needed to reduce the pH from maximum 10 to 6. Although in itself alpha-amino acid additions of more than 1 percent may be used, there is little sense in this, as the effect is thereby not or only scarcely increased.

Manifestly, the amino acid preparation or mixture will contain exclusively components are acceptable for consumption, but indeed one may combine the amino acids with other additives known in the meat products industry. This also holds for the proteins which, together with the amino acids, may be processed into one preparation. Such a preparation preferably does not contain more than 10 percent or less than 1 percent total amino acid calculated on the protein; and its content of the water soluble finely divided protein may be in the range of 10 to 98 percent. Thus, a treating preparation is contemplated which, if made for instance with soluble protein and amino acid contents in a weight ratio of 10 or 1 and used so as to supply 0.1 to 1 percent of the amino acid, based on the meat content of the sausage mass, would at the same time supply 1 to 1 to 10 percent of the water soluble protein calculated on the same basis. Besides the amino acid other meat additives may be present in the preparation, such as nitrite, ascorbic acid, color improving substances or mixtures, sodium chloride and others. The added quantity should be such that the buffering action per 100 grams of meat is at least equivalent to an acid consumption of 10 ml. 0.1 N hydrochloric acid in order to reduce the pH of the added preparation in a 1 percent aqueous solution from its starting value to 6.

Between the protein and the added amino acid or amino acid mixture a synergistic action occurs in the sense that the effect of the combination is better than the sum of the effects of the two components separately. The desired starting pH of the amino acid or the amino acid mixture can be brought, as desired, to the required value by the addition of alkaline or acid ingredients. Except alkaline-reacting sodium- or potassium compounds such as sodium hydroxide, sodium carbonate, sodium bicarbonate, sodium acetate, sodium citrate, sodium tartrate, such ingredients may also be the sodium or potassium salts of the applied amino acid or even of another amino acid. As acid ingredients one may use acid reacting salts such as monosodium phosphate, as well as free acids, such as hydrochloric acid, acetic acid, tartaric acid, citric acid, or also for instance the hydrochloric acid salt of the applied or another amino acid.

One may add the protein and the amino acid or the amino acid containing mixture as a readymade preparation or separately simultaneously prior to or during the cuttering process, but in a number of cases a still better result is obtained if one adds these ingredients separately at the beginning or in different stages of the cuttering process. With advantage one should add in most cases the protein at the beginning of the cuttering and the amino acid in a later stage.

Preferably one uses amino acids of the general formula

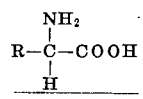

in which R is a H-atom or a hydrocarbon chain, branched or not, which may be interrupted by one sulfur atom and may be substituted by one or more amino groups. The end group of R may be a $-CH_3$, $-CH_2SH$, $-CONH_2$ or

group or a benzene- or imidazole ring.

The solubility of the amino acid in water at a pH of 6±0.5 should be at least 1 percent to prevent the deposit of amino acid crystals in the treated meat product.

The total number of carbon atoms in R may not exceed 8.

Amino acids may be for instance alanine, arginine, asparagine, creatine, creatinine, cysteine, glutamine, glycine, histidine, isoleucine, leucine, lysine, methionine, phenylalanine and/or valine. Amino acids with more than one carboxylic group in an aliphatic carbon chain cannot be used as they do not buffer sufficiently between pH 6 and 10.

Mixtures of the amino acids may also be used to advantage for the buffering action, or at least as a major part of the buffering ingredient. Among such mixtures found particularly suitable are mixtures of sodium glycinate and glycine and mixtures of sodium glycinate and the hydrochloride acid salt of lysine.

With advantage one may add a preparation obtained by partially hydrolizing a protein or protein containing material, in such a way that the preparation, next to the amino acids which are formed, is composed still for the major part of not or only slightly broken down protein. If desired one may process this mass according to a known drying method such as drum drying, sublimation drying, spray drying, to form a dry powder and add the latter to the sausage mass.

In the following some examples are given of the process according to the invention, without however limiting the invention to these examples.

EXAMPLE I

A standard mixture was made with a 1:1 proportion of lean beef to lean pork to which sufficient lard was added to obtain analytically determined fat contents of 25, 30, 35 and 45 percent. The customary additives (flour, salt, nitrite) were added and in all cases a quantity of water amounting to 20 percent of the total weight of meat and lard.

Cuttering was done as follows:

It was started with half the water addition as ice, all the meat, coloring salt, nitrite and the protein; after 3 minutes of cuttering the other half of the water was added as ice and after short cuttering the amino acid mixture. Finally the fat was added and the flour and cuttering was continued for a short period.

The results obtained by the use of a mixture of glycine-sodium glycinate of pH 9.6 and added in a quantity of 0.5 percent based on the meat weight and with the use of 4 percent soy protein (NSI 87.5) based on the total weight, were as follows: all percentages calculated on total weight except the amino acid which was calculated on meat weight):

Table of jelly and fat deposit on manufacturing luncheon sausage from the same meat stuffing (processed in casing, smoked and pasteurized during 2 hours at 79° C.).

| fat | amino acid | protein | fat | jelly | Sum of fat and jelly |
|---|---|---|---|---|---|
| 25% |  |  | 8.2 | 20.1 | 28.3 |
|  | 0.5 |  | 3.0 | 5.1 | 8.1 |
|  |  | 4 | 0.0 | 7.4 | 7.4 |
|  | 0.5 | 4 | 0.0 | 2.3 | 2.3 |
| 35% |  |  | 14.0 | 12.0 | 26.0 |
|  | 0.5 |  | 4.6 | 2.8 | 7.4 |
|  |  | 4 | 1.9 | 6.5 | 8.4 |
|  | 0.5 | 2 4 | 0.1 | 1.2 | 1.3 |
| 45% |  |  | 20.8 | 6.1 | 26.9 |
|  | 0.5 |  | 11.1 | 0.0 | 11.1 |
|  |  | 4 | 1.5 | 1.3 | 2.8 |
|  | 0.5 | 4 | 0.0 | 0.2 | 0.2 |

The figures are always the mean value of 10 determinations.

EXAMPLE II

The mixtures were prepared in the same way as in example I, but now a smaller amount of glycine-glycinate mixture was added (again based on meat) and more protein was used. Also smoking was omitted, but canned and sterilized during 60 minutes at 110° C. The results were as follows:

| fat sum | glycine/ glycinate | protein | fat | jelly |  |
|---|---|---|---|---|---|
| 25% |  |  | 10.6 | 17.0 | 27.6 |
|  | 0.1 |  | 4.9 | 8.0 | 12.9 |
|  |  | 6 | 0.1 | 1.8 | 1.9 |
|  | 0.1 | 6 | 0.0 | 1.0 | 1.0 |
| 45% |  |  | 20.5 | 5.8 | 26.3 |
|  | 0.1 |  | 14.2 | 1.8 | 16.0 |
|  |  | 6 | 0.8 | 0.4 | 1.2 |
|  | 0.1 | 6 | 0.3 | 0.1 | 0.4 |

Determinations always again the mean of 10 samples.

EXAMPLE III

In the same way as in example 1, but with 1 percent glycine/glycinate calculated on meat and 2 percent protein. Further processing completely the same as in example 1. Results were as follows:

| fat | glycine/ glycinate | protein | fat | jelly | sum |
|---|---|---|---|---|---|
| 25% |  |  | 9.0 | 18.4 | 27.4 |
|  | 1.0 |  | 1.8 | 0.2 | 2.0 |
|  |  | 2 | 0.9 | 8.5 | 9.4 |
|  | 1.0 | 2 | 0.0 | 0.0 | 0.0 |
| 45% |  |  | 21.0 | 4.8 | 25.8 |
|  | 1.0 |  | 12.0 | 0.0 | 12.0 |
|  |  | 2 | 2.8 | 10.6 | 13.4 |
|  | 1.0 | 2 | 0.0 | 0.1 | 0.1 |

EXAMPLE IV

The experiments of example 11 were repeated, but now with different amino acids, each adjusted to show a pH of 9 in a 1 percent aqueous solution thereof. As a protein blood plasm was used. The fat content was always 30 percent; the percentage of amino acid addition was 0.5 percent calculated on meat.

| Amino acid used | Protein, percent | Fat | Jelly | Sum | Number ml. 0.1 N HCl to reduce pH from 9 to 6 in 1% aqueous solution per gram of amino acid |
|---|---|---|---|---|---|
| Blank | | 0.8 | 9.1 | 9.9 | |
| Histidine | 4 | 0.1 | 0.0 | 0.1 | 44 |
| Leucine | 4 | 0.2 | 2.2 | 2.4 | 20 |
| Phenyl alanine | 4 | 0.3 | 0.2 | 0.5 | 31 |
| Lysine | 4 | 0.1 | 0.1 | 0.2 | 24 |
| Glutaminic acid | 4 | 0.7 | 8.1 | 8.8 | 18 |
| Asparagic acid | 4 | 0.9 | 4.9 | 5.8 | 14 |

EXAMPLE V

Soy protein was hydrolized during 6 hours with 6 n hydrochloric acid under reflux. Then concentration under evaporation to one-quarter of the volume was done and the liquid was brought to pH 9.4 by the addition of NaOH. An air dry product was prepared by sublimation drying, which product was then added in an amount of 4 percent to the sausage mass of example IV prior to cuttering. As the mean of 10 experiments a fat deposit of 0.4 percent and 0.8 percent jelly was obtained, so in total 1.2 percent.

EXAMPLE VI

A number of trials was made with different amino acids, mixture of amino acids and different proteins. The results are given in the table below.

TABLE

The results of experiments with the standard mixture according to Example I and different additions. Standard mixture with 35% fat and method as in Example I. The buffering ingredient adjusted to pH 9.6 in 1% aqueous solution in all cases.

| No. | Amino acids used 0.5% on meat wt. | Protein added | NSI of added protein | Protein percent on total wt. | Fat | Jelly | Remarks |
|---|---|---|---|---|---|---|---|
| 1 | Blank | None | | 0 | 15.2 | 16.2 | |
| 2 | Histidine/asparagic acid 1:2 | Whey protein | 90 | 4 | 1.0 | 2.2 | Buffering value of mixture OK. |
| 3 | do | Dried egg-white | 84 | 4 | 2.0 | 3.1 | Do. |
| 4 | do | Soy protein | 78 | 4 | 4.1 | 1.9 | Do. |
| 5 | do | do | 35 | 4 | 8.2 | 2.2 | Do. |
| 6 | do | Fish proteins | 75 | 4 | 5.5 | 1.8 | Do. |
| 7 | Glycine sodium salt plus lysine HCl 1:1. | Soy protein | 78 | 4 | 2.2 | 1.0 | |
| 8 | do | do | 35 | 4 | 8.5 | 3.5 | |
| 9 | do | do | 78 | 6 | 0.8 | 0.8 | |
| 10 | Methionine DL | do | 78 | 4 | 3.4 | 1.3 | |
| 11 | do | do | 78 | 6 | 1.2 | 1.3 | |
| 12 | Asparagine | do | 78 | 4 | 4.3 | 1.6 | |
| 13 | Asparagine/histidine 1:1 | do | 78 | 4 | 2.0 | 1.1 | |
| 14 | Lysine HCl plus glycine-K 1:1 | Dried skim milk | 95 | 4 | 2.6 | 1.3 | |
| 15 | Arginine | Soy protein | 78 | 4 | 2.2 | 1.1 | |
| 16 | Hydrolized soy protein (80% hydrolized to amino acids). | do | 78 | 4 | 2.4 | 0.7 | |

What is claimed is:

1. A method for manufacturing improved meat products of the sausage type having increased shelf life and stability, comprising incorporating with ground or chopped animal meat finely divided protein-containing material of vegetable or animal origin, of which at least 40 weight percent of the protein in content is water-soluble protein, as well as from 0.1 to about 1 percent, based upon the weight of said meat, of at least one alpha amino acid selected from the group represented by the formula

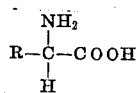

in which R is a hydrogen atom or is a hydrocarbon chain, whether or not branched, which contains not more than 8 carbon atoms and may be interrupted by one sulfur atom and may carry one or more amino groups, and which may have as an end group thereof a $-CH_3$, $-CH_2SH$, $-CONH_2$ or

group or a benzene- or imidazole ring, said amino acid having a solubility of at least 1 percent in water at a pH of 5.5 to 6.5 and either possessing or having been adjusted by an added alkaline or acidic substance to a pH above 6 but not in excess of 10, and possessing a buffering capacity such that, per gram thereof in a 1 percent aqueous solution thereof, at least 20 ml. of 0.1 n hydrochloric acid is required to reduce the pH of such solution from its starting value to 6, the amount of said water soluble protein incorporated with said meat being at least as great as the amount of said amino acid and sufficient with the latter to reduce substantially the formation of fat and jelly deposits in the meat product.

2. A method according to claim 1, said protein-containing material being selected from the group consisting of milk proteins, whey proteins, soy bean proteins, fish proteins, birds egg proteins, blood plasm and potato proteins.

3. A method according to claim 1 wherein, after said protein-containing material and said amino acid have been incorporated with said animal meat, the mixture obtained is heated during the processing thereof into the meat products.

4. A method according to claim 1, wherein said protein-containing material comprises finely divided soy bean protein.

5. A method according to claim 1, wherein said protein-containing material comprises finely divided milk protein.

6. A method according to claim 1, wherein said protein-containing material comprises finely divided chicken egg protein.

7. A method according to claim 1, wherein said at least one amino acid consists predominantly of a mixture of sodium glycinate and glycine.

8. A method according to claim 1, wherein said at least one amino acid consists predominantly of a mixture of sodium glycinate and the hydrochloric acid salt of lysine.

9. A method according to claim 1, wherein said at least one amino acid consists predominantly of one or more compounds selected from the group consisting of histidine and methionine and salts thereof.

10. A method according to claim 1, wherein said at least one amino acid is incorporated with said meat by mixing therewith a dried product of the partial hydrolysis of a vegetable protein by acid.

11. A method according to claim 1, the amount of said water soluble protein being up to about 6 percent of the weight of the meat product.

12. A finely divided additive for reducing the formation of fat and jelly deposits in meat products of the sausage type, made principally of ground or chopped animal meat, comprising a mixture of a finely divided protein-containing material of which at least 40 weight percent of the protein content is water soluble protein and at least one alpha amino acid of the formula

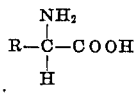

in which R is a hydrogen atom or is a hydrocarbon chain, whether or not branched, which contains not more than eight carbon atoms and may be interrupted by one sulfur atom and may carry one or more amino groups, and which may have as an end group thereof a $-CH_3$, $-CH_2SH$, $-CONH_2$ or

group or a benzene or imidazole ring, said amino acid having a solubility of at least 1 percent in water at a pH of 5.5 to 6.5 and either possessing or having been adjusted by an added alkaline or acidic substance to a pH above 6 but not in excess of 10, and possessing a buffering capacity such that, per gram thereof in a 1 percent aqueous solution thereof, at least 20 ml. of 0.1 n hydrochloric acid is required to reduce the pH of such solution from its starting value to 6, said mixture containing 10 to 98 parts by weight of said water soluble protein to 1 to 10 parts be weight of said amino acid.

* * * * *

UNITED STATES PATENT OFFICE

CERTIFICATE OF CORRECTION

Patent No. 3,617,307                                        Dated November 2, 1971

Petrus Adam Inklaar

Assignor to Vasco Industries Corp.,
a New York corporation.

It is certified that error appers in the above identified patent and that said Letters Patent are hereby corrected as shown below:

ABSTRACT:    Line 5, after "protein," insert "and";
                            Line 7, "slat" should read "salt".

Column 1,    Line 21, "or" should read "of";
                            Line 51, delete "of".

Column 2,    Line 54, after "supply" delete "1";
                            Line 55, before "1" delete "to".

Column 4,    in the first table, at line 23, "24" should read "4";
                            in the second table, under Example II, at line 43, delete "sum" and at line 42 over the last data column read "sum".

Column 5, line 67, after "protein" (first occurrence) delete "in".

Column 8,    Line 17, "be" should read "by".

Signed and sealed this 9th day of May 1972.

(SEAL)
Attest:

EDWARD M. FLETCHER, JR.                        ROBERT GOTTSCHALK
Attesting Officer                                           Commissioner of Patents